United States Patent Office  2,693,244
Patented Nov. 2, 1954

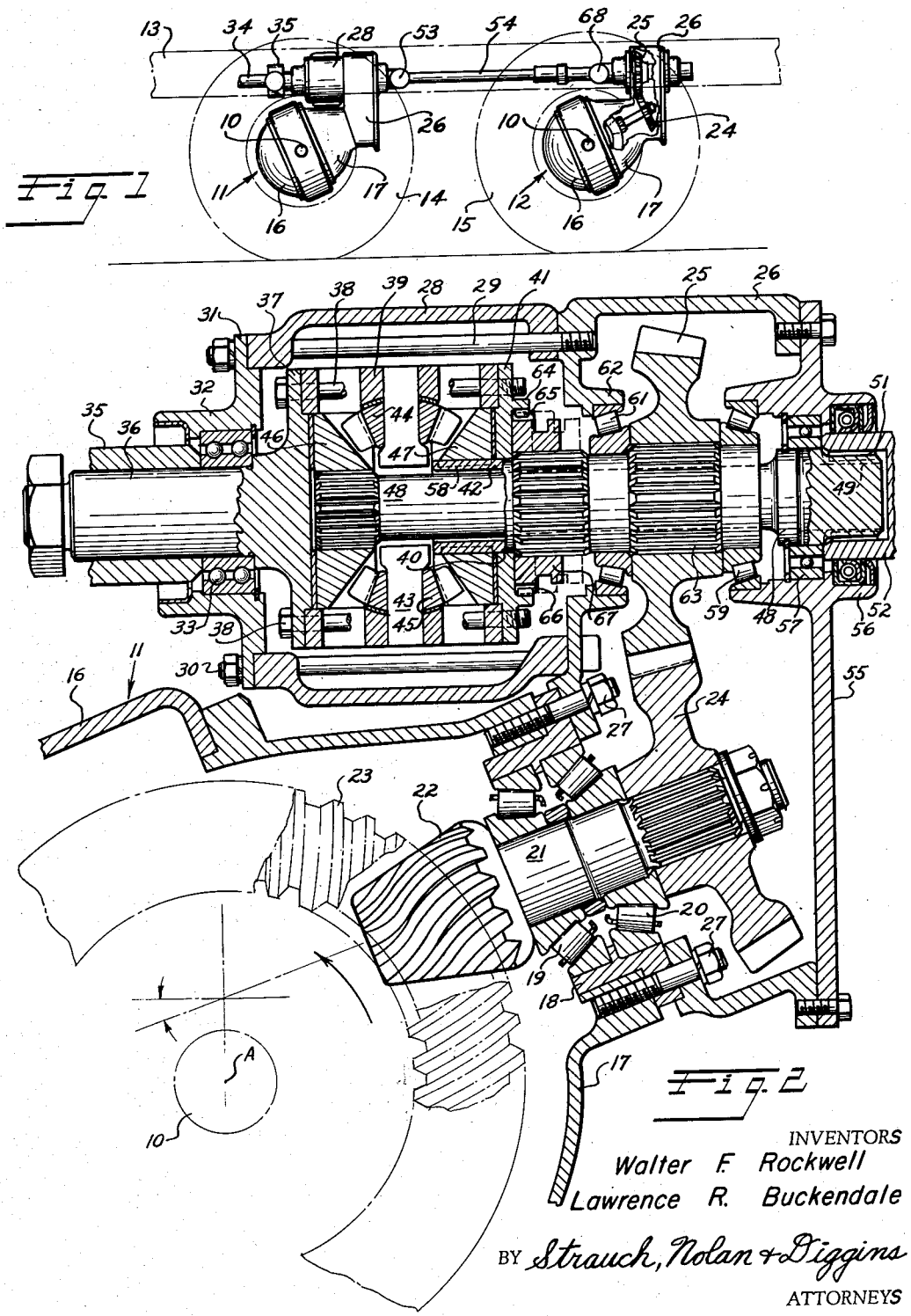

2,693,244

MULTIWHEELER WITH ANGLE DRIVE

Walter F. Rockwell and Lawrence R. Buckendale, Detroit, Mich., assignors, by mesne assignments, to Rockwell Spring and Axle Company, Coraopolis, Pa., a corporation of Pennsylvania Application June 15, 1950, Serial No. 168,304

2 Claims. (Cl. 180—22)

This invention relates to multi-wheel drive assemblies and particularly to multi-wheel drive assemblies wherein special angularly directed double reduction drive mechanisms are provided.

The invention will be described in its preferred embodiment as a tandem drive axle assembly wherein an engine driven propeller shaft assembly extends toward and above two tandem axles and special drive mechanisms disposed at an angle to the propeller shaft assembly extend downwardly into the axle differentials.

It is a major object of our invention to provide a novel tandem axle assembly wherein two closely grouped drive axles have their axle shaft drive mechanisms connected to a longitudinally extending engine driven shaft assembly by drive mechanisms that extend downwardly at an angle with respect to the axis of the engine driven shaft assembly.

It is a further object of our invention to provide a novel tandem axle assembly wherein a longitudinal engine driven shaft assembly is connected to the respective drive axles through shafts which extend downwardly and forwardly at substantially the same angle with respect to the engine driven shaft assembly.

Further objects of the invention will become apparent as the description proceeds in connection with the appended claims and the annexed drawings wherein:

Figure 1 illustrates partly diagrammatically and partly in full line elevation the rear end of a motor vehicle supported by closely adjacent tandem axles having the drive arrangement of the invention according to a preferred embodiment; and Figure 2 is an enlarged section through the foremost tandem axle drive mechanism, illustrating particularly details of the drive gearing and the differential lock out mechanism therein.

Our novel drive mechanism comprises parallel tandem axle assemblies 11 and 12 that extend transversely of the vehicle whose chassis is indicated at 13. Axles 11 and 12 are supported at opposite ends in a conventional manner by wheels 14 and 15. The axles are connected to the chassis by suitable springs (not shown). The differential portion of each axle is illustrated in full lines in Figure 1, as this is the portion which is most concerned with illustration of the invention. Referring to Figure 2, which illustrates a longitudinal section through foremost axle 11 of Figure 1, axle 11 comprises a differential housing receiving portion 16 which is enlarged and contains therein a conventional differential mechanism rotatable about the axis A of axle shaft 10 which is also the axis of rotation of the wheel 14.

As illustrated in Figure 1, the differential portion of the axle housing opens rearwardly and is tilted upwardly, and it is provided with a rearwardly upwardly extending nose portion 17 wherein is mounted an adapter collar 18. A short pinion shaft 21 is journalled intermediate its ends on two closely adjacent tapered roller bearing units 19 and 20 mounted on collar 18. This bearing assembly resists thrust in both axial directions.

The pinion shaft 21 is provided at its lower forward end with a rigid, preferably integral pinion gear 22 which constantly meshes with a ring gear 23 fixed to the differential housing (not shown) and rotatable about the axle axis A.

On the other side of the bearing assembly, a gear 24 is non-rotatably splined to pinion shaft 21 and is constantly meshed with a gear 25 mounted above it as will appear.

Gears 24 and 25 are mounted in a gear housing 26 that is secured to nose 17 as by studs 27 and projects above the level of axle 11 for enclosing and supporting the engine driven shaft assembly as will appear. Above axle 11 the forward end of housing 26 opens into a differential enclosing housing 28 that is secured to it by studs 29 and 30. A front wall 31 also secured to housing 28 by studs 29 is formed with a forwardly projecting boss 32 containing a roller bearing 33. Housing 28 overhangs nose 17.

An engine driven shaft 34, which extends from the usual selective speed transmission of the vehicle, is connected by a universal joint 35 to a shaft 36 that is journalled in bearing 33 for rotation about an axis normally horizontal and longitudinal of the vehicle.

Within housing 28, shaft 36 is formed with an enlarged integral flange 37 secured, as by the elongated studs indicated at 38, to a differential cage 39. The rear wall of differential cage 39 is a plate 41 also secured to the cage by studs 38 and journaled at 40 for free rotation on a hollow shaft 42 concentric with shaft 36.

The differential cage carries a spider 43 on which is journalled pinion gears 44 and 45 constantly meshed with opposite coaxial side gears 46 and 47. Side gear 46 is splined so as to be non-rotatably mounted upon the forward end of a short shaft 48 that extends freely through hollow shaft 42 as illustrated in Figure 2, and shaft 48 is formed at its rear end with a spline 49 by which it is non-rotatably coupled within a splined internal bore 51 at the forward end of a shaft 52. Shaft 52 is connected through universal joint 53 to a propeller shaft extension section 54 that leads to the rear axle 12. The removable rear wall 55 of housing 26 is formed with a boss 56 for mounting a bearing 57 supporting the rear end of shaft 48.

Side gear 47 is splined at 58 or otherwise non-rotatably connected to the forward end of hollow shaft 42 so that when side gear 47 is rotated shaft 42 will be driven for a purpose to be described. Within housing 26, hollow shaft 42 is supported in spaced tapered roller bearings 59 and 61 mounted respectively in boss 56 and a coaxial boss 62 in the front wall of housing 26. Bearings 59 and 61 abut opposite sides of the hub of gear 25 which is non-rotatably mounted on shaft 42 as by the spline section 63 and they afford support of maximum strength for gear 25.

Back plate 41 of differential cage 39 is formed with a rearwardly extending annular boss 64 formed with a row of internal clutch teeth 65 adapted to be engaged by a row of clutch teeth 66 on a clutch collar 67 that is slidably mounted for displacement between the full and broken line positions illustrated in Figure 2. In its full line position, collar 67 locks the differential cage for rotation with hollow shaft 42 to provide a direct drive for gear 25 and the foremost axle 11. In the broken line position of clutch collar 67 in Figure 2 hollow shaft 42 is driven through the differential within housing 28. At all times the rearmost axle 12 is directly driven through shaft 48.

Rear axle 12 has a differential portion 16 and upwardly and rearwardly inclined nose portion 17, and a gear housing 26 is mounted on nose portion 17 just as in axle 11. As in axle 11, this housing structure encloses and supports a gear 25 meshed with a gear 24 on a pinion shaft 21 having a pinion gear 22 meshed with a differential ring gear 23, all as in axle 11. Gear 25 is suitably drive connected to shaft section 54 through a universal joint 68. Gears 25 and 24, shaft 21 and the differential mechanism in axle 12 are preferably mounted exactly as shown in Figure 2, with the supporting shaft for gear 25 being directly coupled to the rear end of universal joint 68. The axis of gear 25 in axle 12 is substantially horizontal, and the angle of shaft 21 is the same as in axle 11. In other words the angle drives to axles 11 and 12 are the same except for the interposition of the differential within housing 28. Reference is made to the copending application of Francis H. Boor, Serial Number 154,967, filed April 10, 1950, for further illustration of this direct drive for axle 12, the Boor application and this application having a common assignee.

In each of axle assemblies 11 and 12, gears 24 and 25 comprising the first reduction are spiral bevel gears having their teeth in constant mesh at the proper angle. Also in each axle assembly the second reduction gears 22 and 23 are hypoid gears, the axis of shaft 21 intersecting a vertical plane passing through the axis A at a point about two inches above axis A. The angle of each shaft 21 to the horizontal is preferably about 30°. This arrangement is especially desirable in short coupled tractors for trailers in that it enables the tandem axle assembly to be located nearer the front steering wheels. The hypoid angle drive enables mounting of the engine driven shaft assembly at a suitably high level with only small angularity in the universal joints.

In operation, assuming that the clutch collar 67 is in the full line clutch engaged position of Figure 2, a suitable operator being provided for the clutch collar but not shown as such is a conventional expedient in the art, when shaft 36 is driven the differential cage 39 rotates thereby directly driving both shaft 48 and hollow shaft 42 at the same speed. The differential lockout provided by the engaged clutch prevents any differential action between the drives to the axles 11 and 12. However, when clutch collar 67 is in the dotted line disengaged position of Figure 2, rotation of the cage 39 on its journal 40 is effective to rotate both side gears 46 and 47 through the spider and this provides a differential action between the drives to the two tandem axles 11 and 12 should they encounter different tractive conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An interaxle differential equipped tandem axle assembly and drive therefor for short coupled vehicles comprising a pair of spaced parallel drive axles adapted to extend transversely beneath a vehicle frame and to be supported at their outer ends by ground engaging wheels, said axles being each provided with a differential receiving portion in the housing thereof and a differential mechanism rotatably mounted therein; a power shaft drive for said axles providing an optimum spacing of the propeller shaft universal joints for both an interaxle propeller shaft connecting said axles and an engine driven propeller shaft supplying power to the interaxle differential, said power shaft drive extending above the differential receiving portions of said axles and comprising an interaxle differential mounted upon the forward axle above the axle differential mechanism thereof and rearwardly of the axis of rotation of that differential mechanism, a shaft rotatably mounted on each of said axles about axes extending longitudinally of the vehicle, means including said interaxle propeller shaft drive connecting the one of said shafts rotatably mounted on the rear axle to one of the opposed side gears of said interaxle differential mechanism, means connecting the other of said shafts to the other side gear of said interaxle differential mechanism, a propeller shaft for universally connecting the cage of said interaxle differential mechanism to the vehicle prime mover; and means in each of said axles for transmitting drive torque to the differential mechanism thereof from the associated one of said side gear connected shafts; each such means comprising a pair of constantly meshed bevel gears, a pair of constantly meshed hypoid gears, means attaching one of said bevel gears to the associated one of said side gear connected shafts for rotation therewith, means mounting one of said hypoid gears for coaxial rotation with the associated axle differential mechanism, and a shaft journalled in axially fixed relation upon said axle housing about an axis lying in a plane normal to the axle differential axis of rotation, the axis of said shaft extending above such differential axis of rotation and rearwardly and upwardly therefrom; said shaft being fixed for coaxial rotation with both said other hypoid gear and other bevel gear.

2. The combination defined in claim 1 wherein the differential receiving portion of each said axle housing opens rearwardly, is tilted upwardly and is provided with a rearwardly upwardly extending nose portion in which the shaft connecting the said other hypoid and bevel gears is journalled.

References Cited in the file of this patent

UNITED STATES PATENTS

| Number | Name | Date |
|---|---|---|
| 1,471,295 | Thorp | Oct. 16, 1923 |
| 1,492,380 | Leipert | Apr. 29, 1924 |
| 1,574,047 | Midboe | Feb. 23, 1926 |
| 1,644,023 | Marcum | Oct. 4, 1927 |
| 1,845,318 | Mooers | Feb. 16, 1932 |
| 1,992,365 | Fageol | Feb. 26, 1935 |
| 2,033,246 | Keese | Mar. 10, 1936 |
| 2,064,262 | Keese | Dec. 15, 1936 |
| 2,126,876 | Doman | Aug. 16, 1938 |
| 2,166,099 | Quartillo | July 11, 1939 |
| 2,195,479 | Buchner | Apr. 2, 1940 |
| 2,228,581 | Olen | Jan. 14, 1941 |
| 2,607,431 | Buckendale | Aug. 19, 1952 |

FOREIGN PATENTS

| Number | Country | Date |
|---|---|---|
| 622,579 | Great Britain | May 4, 1949 |